US011908385B2

(12) United States Patent
Zhang

(10) Patent No.: US 11,908,385 B2
(45) Date of Patent: Feb. 20, 2024

(54) DRIVING APPARATUS AND DRIVING METHOD FOR DISPLAY PANEL, AND DISPLAY APPARATUS

(71) Applicant: Chengdu Vistar Optoelectronics Co., Ltd., Sichuan (CN)

(72) Inventor: Donghao Zhang, Kunshan (CN)

(73) Assignee: Chengdu Vistar Optoelectronics Co., Ltd., Chengdu (CN)

( * ) Notice: Subject to any disclaimer, the term of this patent is extended or adjusted under 35 U.S.C. 154(b) by 0 days.

(21) Appl. No.: 17/668,534

(22) Filed: Feb. 10, 2022

(65) Prior Publication Data

US 2022/0270543 A1 Aug. 25, 2022

Related U.S. Application Data

(63) Continuation of application No. PCT/CN2020/099668, filed on Jul. 1, 2020.

(30) Foreign Application Priority Data

Sep. 11, 2019 (CN) ......................... 201910857865.2

(51) Int. Cl.
*G09G 3/32* (2016.01)

(52) U.S. Cl.
CPC ....... *G09G 3/32* (2013.01); *G09G 2300/0439* (2013.01); *G09G 2300/0842* (2013.01); *G09G 2330/021* (2013.01)

(58) Field of Classification Search
CPC .......... G09G 3/20; G09G 3/36; G09G 3/3233; G09G 3/3283; G09G 3/325; G09G 3/3266; G09G 3/34; G09G 3/32
See application file for complete search history.

(56) References Cited

U.S. PATENT DOCUMENTS

2004/0090446 A1 5/2004 Lee et al.
2005/0212729 A1 9/2005 Chung et al.
(Continued)

FOREIGN PATENT DOCUMENTS

CN 1622184 A 6/2005
CN 1920927 A 2/2007
(Continued)

OTHER PUBLICATIONS

International Search Report dated Sep. 28, 2020 in corresponding International Application No. PCT/CN2020/099668; 6 pages.
(Continued)

*Primary Examiner* — Michael A Faragalla
(74) *Attorney, Agent, or Firm* — Maier & Maier, PLLC

(57) ABSTRACT

A driving method includes row scanning circuit configured to output scanning signals to sub-pixels in the display panel for plurality of times within one frame and output the scanning signals to the sub-pixels in the display panel in plurality of sub-frames each time; a data processor is configured to receive a display data stream including the display data corresponding to the sub-pixels in the plurality of sub-frames, split the display data stream according to analog-bit display data and digital-bit display data, and output the split display data stream to a column scanning circuit; and the column scanning circuit is configured to generate corresponding data signals of bright-state analog data voltages according to the analog-bit display data and transmit corresponding data signals of dark-state digital data voltages or the corresponding data signals of bright-state analog data voltages to corresponding sub-pixels in the display panel according to the digital-bit display data.

18 Claims, 6 Drawing Sheets

(56) References Cited

U.S. PATENT DOCUMENTS

| | | | | |
|---|---|---|---|---|
| 2009/0051708 | A1 | 2/2009 | Ko | |
| 2015/0042697 | A1* | 2/2015 | Park | G09G 3/2092 345/77 |
| 2015/0287353 | A1 | 10/2015 | Song et al. | |
| 2016/0125843 | A1 | 5/2016 | Kim et al. | |
| 2016/0180771 | A1 | 6/2016 | Jeong | |
| 2017/0098415 | A1* | 4/2017 | Hyun | G09G 3/3266 |
| 2018/0061302 | A1* | 3/2018 | Hu | G09G 3/3648 |
| 2019/0251910 | A1 | 8/2019 | Kasai et al. | |

FOREIGN PATENT DOCUMENTS

| | | | |
|---|---|---|---|
| CN | 103247259 | A | 8/2013 |
| CN | 103959365 | A | 7/2014 |
| CN | 104751780 | A | 7/2015 |
| CN | 105632424 | A | 6/2016 |
| CN | 106205452 | A | 12/2016 |
| CN | 106652963 | A | 5/2017 |
| CN | 107735832 | A | 2/2018 |
| CN | 107993609 | A | 5/2018 |
| CN | 108877643 | A | 11/2018 |
| CN | 109994579 | A | 7/2019 |
| CN | 110570810 | A | 12/2019 |
| IN | 101855664 | A | 10/2010 |
| JP | 2000310980 | A | 11/2000 |
| JP | 2007323036 | A | 12/2007 |
| KR | 20100095568 | A | 8/2010 |
| KR | 1020150018966 | A | 2/2015 |
| KR | 1020170040401 | A | 4/2017 |
| WO | 2009/082056 | A1 | 7/2009 |

OTHER PUBLICATIONS

First Office Action dated Sep. 16, 2020 in corresponding Chinese Application No. 201910857865.2; 15 pages.

Office Action dated Feb. 28, 2023, in corresponding Japanese Application No. 2022-513696, 8 pages.

Extended European Search Report dated Sep. 29, 2022, in corresponding European Application No. 20864059.9; 12 pages.

“2 : 1 MUX-using-transmission-gate”, URL:http://web.archive.org/web/20180325130419/https://www.electronics-tutorial.net/Digital-CMOS-Design/Pass-Transistor-Logic/2-1-MUX-using-transmission-gate/, XP002807549, Mar. 25, 2018, 6 pages.

Office Action dated Aug. 21, 2023, in corresponding Korean Application No. 10-2022-7006815, 15 pages.

Office Action dated Jun. 20, 2023, in corresponding Japanese Application No. 2022-513696, 6 pages.

* cited by examiner

DRIVING APPARATUS AND DRIVING METHOD FOR DISPLAY PANEL, AND DISPLAY APPARATUS

CROSS-REFERENCE TO RELATED APPLICATION(S)

This application is a continuation of International Patent Application No. PCT/CN2020/099668, filed Jul. 1, 2020, which claims priority to Chinese Patent Application No. 201910857865.2 filed on Sep. 11, 2019, the disclosures of both of which are incorporated herein by reference in their entireties.

TECHNICAL FIELD

Embodiments of the present application relate to the field of display technologies, for example, relate to a driving apparatus for a display panel, a driving method for a display panel, and a display apparatus.

BACKGROUND

The development of display technologies calls for increasingly higher accuracy of grayscale control.

For a display apparatus in the related art, grayscale control is implemented in a manner of digital driving or analog driving. However, digital driving easily leads to a "false contour", while analog driving makes high-grayscale images difficult to expand. Accordingly, the display effect is affected.

SUMMARY

The present application provides a driving apparatus for a display panel, a driving method for a display panel, and a display apparatus to implement a digital-analog hybrid driving for the display panel and enhance the display effect.

In a first aspect, embodiments of the present application provide a driving apparatus for a display panel. The driving apparatus includes a row scanning circuit, a column scanning circuit, and a data processor. The column scanning circuit is electrically connected to the data processor.

The row scanning circuit is configured to output scanning signals to sub-pixels in the display panel for a plurality of times within one frame and output the scanning signals to the sub-pixels in the display panel in a plurality of sub-frames each time of the plurality of times.

The data processor is configured to receive a display data stream including the display data corresponding to the sub-pixels in the plurality of sub-frames, split the display data stream according to analog-bit display data and digital-bit display data both included in the display data, and output the split display data stream to a column scanning circuit. The column scanning circuit is configured to generate data signals of bright-state analog data voltages according to the analog-bit display data and transmit corresponding data signals of dark-state digital data voltages or corresponding data signals of the bright-state analog data voltages to corresponding sub-pixels in the display panel according to the digital-bit display data.

In a second aspect, embodiments of the present application further provide a display apparatus. The display apparatus includes the driving apparatus for the display panel described in the first aspect of embodiments of the present application and the display panel connected to the driving apparatus.

In a third aspect, the embodiments of the present disclosure further provide a driving method for a display panel. The driving method includes the steps below.

A row scanning circuit outputs scanning signals to sub-pixels in the display panel for a plurality of times within one frame and outputs the scanning signals to the sub-pixels in the display panel in a plurality of sub-frames each time of the plurality of times. A data processor receives a display data stream including the display data corresponding to the sub-pixels in the plurality of sub-frames, splits the display data stream according to analog-bit display data and digital-bit display data both included in the display data, and outputs the split display data stream to a column scanning circuit. A column scanning circuit generates data signals of bright-state analog data voltages according to the analog-bit display data and transmits corresponding data signals of dark-state digital data voltages or corresponding data signals of the bright-state analog data voltages to corresponding sub-pixels in the display panel according to the digital-bit display data.

In the driving apparatus and driving method for a display panel provides in the present embodiments, the row scanning circuit outputs scanning signals to sub-pixels in the display panel for a plurality of times within one frame and outputs the scanning signals to the sub-pixels in the display panel in a plurality of sub-frames each time of the plurality of times. The data processor splits a display data stream according to the analog-bit display data included in the display data and the digital-bit display data included in the display data and outputs the split display data stream to the column scanning circuit. The column scanning circuit generates corresponding data signals of bright-state analog data voltages according to the analog-bit display data and transmits generated corresponding data signals of dark-state digital data voltages or the generated corresponding data signals of the bright-state analog data voltages to corresponding sub-pixels in the display panel according to the digital-bit display data. Compared with the related driving method of pure digital driving, relatively fewer sub-frames are divided in the driving method for a display panel provided in the present embodiments. Accordingly, difference between a luminous duration of a sub-frame with a shorter luminous duration and a luminous duration of a sub-frame with a longer luminous duration is relatively small, restraining the "false contour" of the display to a certain degree and enhancing the display effect. Moreover, in the driving method for a display panel provided in the present embodiments, a total number of bright-state analog data voltages is relatively fewer. Accordingly, the bright-state analog data voltages can be fully expanded to enable an accurate correspondence between various display grayscales and bright-state analog data voltages, avoiding the problem that high-grayscale images cannot be expanded through pure analog driving in the related art and thus enhancing the display effect.

DETAILED DESCRIPTION

Figure 1:
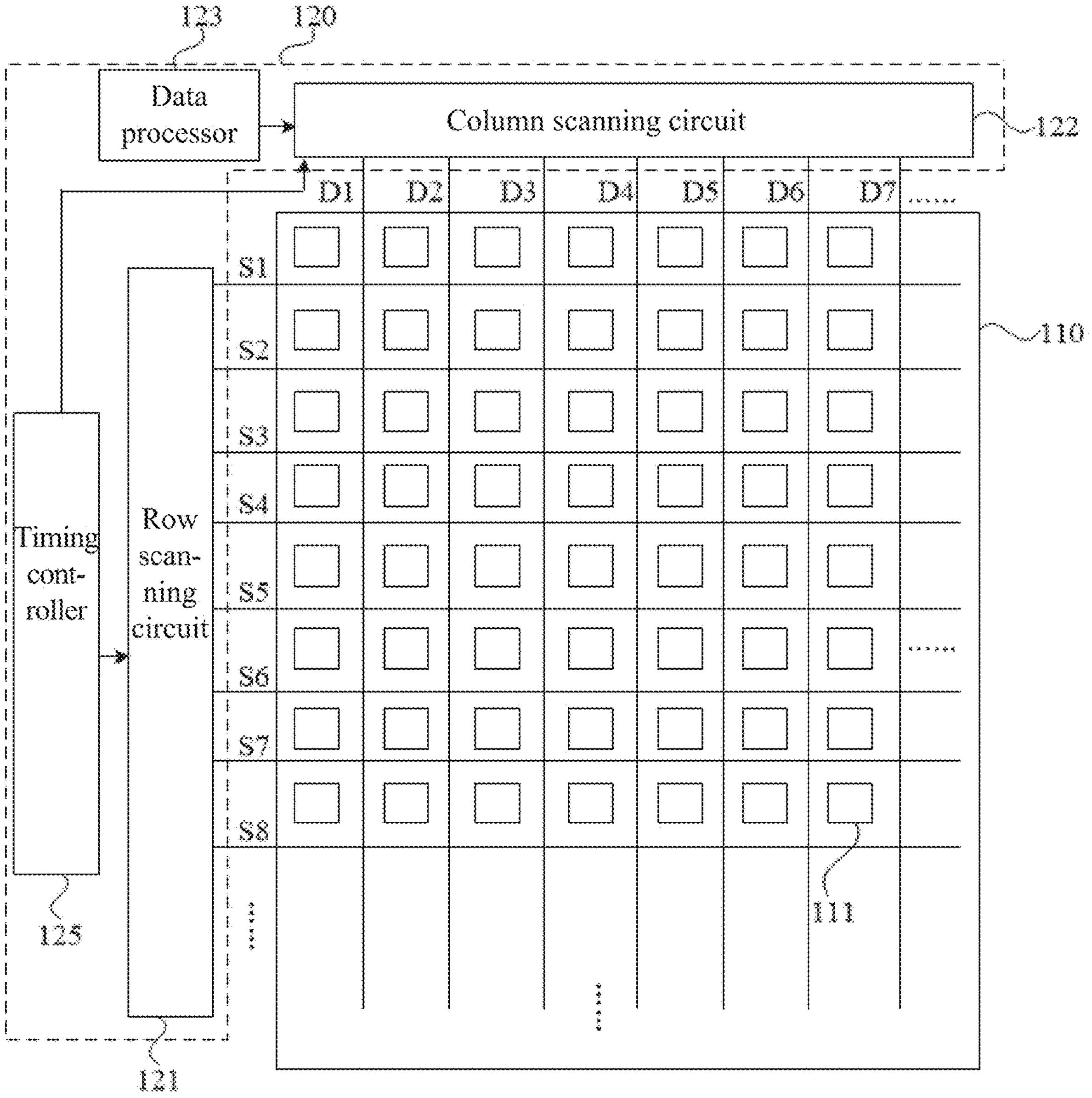
FIG. 1 is a schematic diagram of a driving apparatus for a display panel according to embodiments of the present application.

The present application will be further described with reference to the accompanying drawings and embodiments. The embodiments described herein are merely intended to explain but not to limit the present application. For ease of description, only part, not all, of structures related to the present application are illustrated in the drawings.

For a display apparatus in the related art, grayscale control is implemented through digital driving or analog driving. However, digital driving easily leads to a "false contour", while analog driving makes high-grayscale images difficult to expand. Accordingly, the display effect is affected. The applicant finds that the reason for the preceding problem lies in that in a case where the method of pure digital driving is applied to drive the display panel, a frame of display images is divided into many sub-frames. Luminous durations in different sub-frames are different. Display grayscales are controlled by controlling a total luminous duration within one frame. In a case where a sub-frame with a longer luminous duration is converted into a sub-frame with a shorter luminous duration, a relatively larger difference between the luminous durations of the two sub-frames easily leads to a "false contour" and affects the display effect. In a case where the method of pure analog driving is applied to drive the display panel, the brightness of sub-pixels in the display panel is controlled by controlling data voltages, whereby the display grayscales are controlled. Since the data voltages corresponding to different display grayscales are different, a plurality of different data voltages are required for implementing a relatively rich color display. However, a range of the data voltages provided by a driver chip is usually limited. After data voltages provided by the driver chip being in a full correspondence to grayscales in a relatively lower grayscale range, only a small range of data voltages is available to be in correspondence to grayscales in a relatively higher range, making high-grayscale images difficult to expand. That is, data voltages fail to be in full correspondence to high display grayscales, thus affecting the display effect.

In view of the preceding problems, embodiments of the present application provide a driving apparatus for a display panel. The driving apparatus 120 for a display panel is included in a display apparatus. The display apparatus further includes a display panel 110. Referring to FIG. 1, the driving apparatus 120 for a display panel includes a row scanning circuit 121, a column scanning circuit 122, and a data processor 123. The column scanning circuit 122 is electrically connected to the data processor 123. The row scanning circuit 121 is configured to output scanning signals to sub-pixels 111 in the display panel 110 for a plurality of times within one frame and output the scanning signals to the sub-pixels 111 in the display panel 110 in a plurality of sub-frames each time of the plurality of times. The data processor 123 is configured to receive a display data stream including the display data corresponding to the sub-pixels 111 in the sub-frames, split the display data stream according to the analog-bit display data included in the display data and the digital-bit display data included in the display data, and output the split display data stream to the column scanning circuit 122. The column scanning circuit 122 is configured to transmit the generated corresponding data signals of bright-state analog data voltages to corresponding sub-pixels 111 in the display panel 110 according to the analog-bit display data and transmit corresponding data signals of dark-state digital data voltages or corresponding data signals of bright-state digital data voltages to corresponding sub-pixels 111 in the display panel 110 according to the digital-bit display data.

Figure 2:
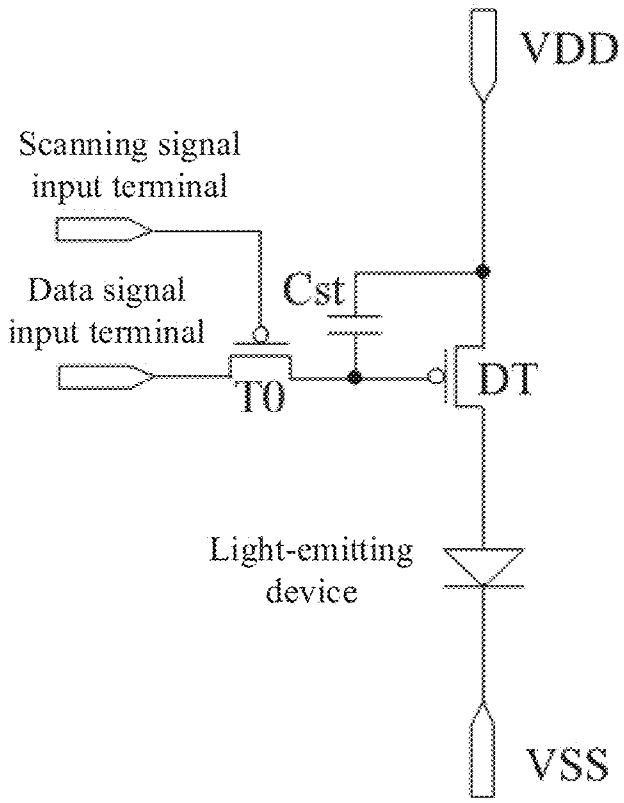
FIG. 2 is a schematic diagram of a pixel circuit according to embodiments of the present application.

In an embodiment, the row scanning circuit 121 may include a plurality of output terminals. Each output terminal is connected to a scanning line. Each scanning line may connect a row of sub-pixels 111. The row scanning circuit 121 may provide scanning signals for the sub-pixels 111 in the display panel 110 through the scanning lines. A pixel circuit may be included in the sub-pixels 111. FIG. 2 is a schematic diagram of a pixel circuit according to embodiments of the present application. The pixel circuit included in the sub-pixels 111 may be the pixel circuit illustrated in FIG. 2. The pixel circuit includes a data writing transistor T0 and a driving transistor DT. The data writing transistor T0 is configured to control a data voltage to be written into a gate of the driving transistor DT. The driving transistor DT is configured to drive a light-emitting device to emit light according to a gate voltage of the driving transistor DT. The pixel circuit further includes a scanning signal input terminal Scan, a data signal input terminal Vdata, a storage capacitor Cst, a first voltage input terminal VDD, a second voltage input terminal VSS, and a light-emitting device LED. The row scanning circuit 121 may be electrically connected to the scanning signal input terminal Scan of the pixel circuit through a scanning line. The scanning signal input terminal Scan is electrically connected to a gate of the data writing transistor T0. Accordingly, in a case where the row scanning circuit 121 inputs scanning signals to the scanning signal input terminal Scan of the pixel circuit through scanning lines, the data writing transistor T0 is turned on to enable the data voltages to be written into the gate of the driving transistor DT. In this embodiment, the row scanning circuit 121 may perform scanning for a plurality of times within one frame and output the scanning signals to the sub-pixels 111 in the display panel 110 in a plurality of sub-frames each time of the plurality of times. Moreover, in an embodiment, a number of sub-frames in each frame is equal to each other. Luminous durations of the sub-pixels 111 in the divided sub-frames may be unequal.

Accordingly, in a case where scanning is performed for each sub-pixel 111 for a plurality of times, data-writing is performed for each sub-frame once. A total luminous duration of the sub-pixels 111 within one frame may be controlled by controlling the bright state or the dark state of the sub-pixels 111 in each sub-frame.

In this embodiment, the pixel circuit included in the sub-pixels 111 are not limited to the structure of the pixel circuit illustrated in FIG. 2 and may be another structure, which is not limited in the present application.

For example, the display apparatus may include an image data signal processing chip that generates a display data stream. The data processor 123 may receive the display data stream from the image data signal processing chip. In an embodiment, the display data stream includes the display data corresponding to the sub-pixels 111 in each sub-frame.

Moreover, the display data include analog-bit display data and digital-bit display data. In an embodiment, the analog-bit display data and the digital-bit display data are both binary digital signals. For example, 01010101 is the display data corresponding to the sub-pixels 111 in a scan. For example, the first three bits are analog-bit display data and the last five bits are digital-bit display data. The data processor 123 may split the display data stream according to the analog-bit display data included in the display data and the digital-bit display data included in the display data. For example, the analog-bit display data in the display data and the digital-bit display data in the display data are separated from each other and then are output to the column scanning circuit 122 separately.

In this embodiment, in a case where the row scanning circuit 121 provides scanning signals for the sub-pixels 111, the column scanning circuit 122 outputs corresponding data voltages to the sub-pixels 111. With continued reference to FIG. 2, the column scanning circuit 122 may be electrically connected to the data signal input terminal Vdata through a data line and thus provide data voltages for the data signal input terminal Vdata through the data line.

In an embodiment, each piece of analog-bit display data may correspond to one bright-state analog data voltage. For example, as for the preceding display data 01010101, if the first three bits are analog-bit display data and the display data is binary data, a total number of analog-bit display data made available by the column scanning circuit 122 is eight. Correspondingly, a number of bright-state analog data voltages is eight. The analog-bit display data determines bright-state analog data voltages generated by the column scanning circuit 122.

The digital-bit display data may be control the column scanning circuit 122 to output the corresponding data signals of dark-state digital data voltages or the corresponding data signals of bright-state analog data voltages. A number of bits of the digital-bit display data may correspond to a number of sub-frames divided in the scanning each time. For example, as for the preceding display data 01010101, in a case where the last five bits are the digital-bit display data, it indicates that a frame is divided into five sub-frames in the scanning each time. In an embodiment, 0 represents the dark state of a light-emitting device in the sub-pixels 111, and 1 represents the bright state of the light-emitting device in the sub-pixels 111. Within a sub-frame, after the display data corresponding to a certain sub-pixel 111 is determined, the column scanning circuit 122 may firstly generate bright-state analog data voltages according to the analog-bit display data, and then determine to transmit the corresponding data signals of dark-state digital data voltages or the corresponding data signals of bright-state analog data voltages to the sub-pixel 111 according to the digital-bit display data.

For example, as for the preceding display data 01010101, the analog-bit display data (the first three bits 010), for example, corresponds to a bright-state analog data voltage of 2.57V. The digital-bit display data (the last five bits 10101) corresponds to the bright state or the dark state of the sub-pixels 111 within the five frames. From the lowest bit to the highest bit, the last five bits correspond to a first sub-frame, a second sub-frame, a third sub-frame, a fourth sub-frame, and a fifth sub-frame respectively. Therefore, within the first sub-frame, the column scanning circuit 122 transmits the corresponding data signal of the bright-state analog data voltage of 2.57 V to the sub-pixels 111. Within the second sub-frame, the column scanning circuit 122 transmits the corresponding data signal of the dark-state analog data voltage to the sub-pixels 111. Within the third sub-frame, the column scanning circuit 122 transmits the data signal of the corresponding bright-state analog data voltage of 2.57 V to the sub-pixels 111. Within the fourth sub-frame, the column scanning circuit 122 transmits the corresponding data signal of the dark-state analog data voltage to the sub-pixels 111. Within the fifth sub-frame, the column scanning circuit 122 transmits the corresponding data signal of the bright-state analog data voltage of 2.57 V to the sub-pixels 111. Through the analog-bit display data, the brightness of the sub-pixel 111 is controlled by controlling the bright-state analog data voltages. Through the digital-bit display data, the total luminous duration of the sub-pixels 111 within one frame is controlled by controlling the luminous duration of the sub-pixels 111 when scanning is performed for the row scanning circuit 121 each time. Accordingly, the display grayscales of the sub-pixels 111 are controlled by jointly controlling the brightness and luminous duration of the sub-pixel 111. In such a way, the digital-analog hybrid driving for the display panel 110 is implemented. The digital-analog hybrid driving for the display panel 110 enables that display grayscales may be controlled by jointly control the brightness and luminous duration of sub-pixels 111 within one frame. Correspondingly, the number of the divided sub-frames is relatively small and the difference between a luminous duration of a sub-frame with a shorter luminous duration and a luminous duration of a sub-frame with a longer luminous duration is relatively small, restraining the “false contour” of the display to a certain degree. Moreover, the total number of bright-state analog data voltages provided by the column scanning circuit 122 is relatively small, helping with the expansion of bright-state analog data voltages and thus avoiding the problem of a poor display effect caused by high-grayscale images that cannot be expanded. The digital-analog hybrid driving for the display panel 110 may make up for the shortcomings of either digital driving or analog driving alone and thus enhance the quality of the image display.

In the driving apparatus for a display panel provided in the present embodiments, the row scanning circuit outputs scanning signals to sub-pixels in the display panel for a plurality of times within one frame and outputs the scanning signals to the sub-pixels in the display panel in a plurality of sub-frames each time of the plurality of times. The data processor splits a display data stream according to the analog-bit display data included in the display data and the digital-bit display data included in the display data and outputs the split display data stream to the column scanning circuit. The column scanning circuit generates corresponding data signals of bright-state analog data voltages according to the analog-bit display data and transmits generated corresponding data signals of dark-state digital data voltages or the generated corresponding data signals of the bright-state analog data voltages to corresponding sub-pixels in the display panel according to the digital-bit display data. Compared with the related driving method of pure digital driving, relatively fewer sub-frames are divided in the driving method for a display panel provided in the present embodiments. Accordingly, difference between a luminous duration of a sub-frame with a shorter luminous duration and a luminous duration of a sub-frame with a longer luminous duration is relatively small, restraining the “false contour” of the display to a certain degree and enhancing the display effect. Moreover, in the driving method for a display panel provided in the present embodiments, a total number of bright-state analog data voltages is relatively fewer. Accordingly, the bright-state analog data voltages can be fully expanded to enable an accurate correspondence between various display grayscales and bright-state analog data voltages, avoiding the problem that high-grayscale images cannot be expanded through pure analog driving in the related art and thus enhancing the display effect.

Figure 3:
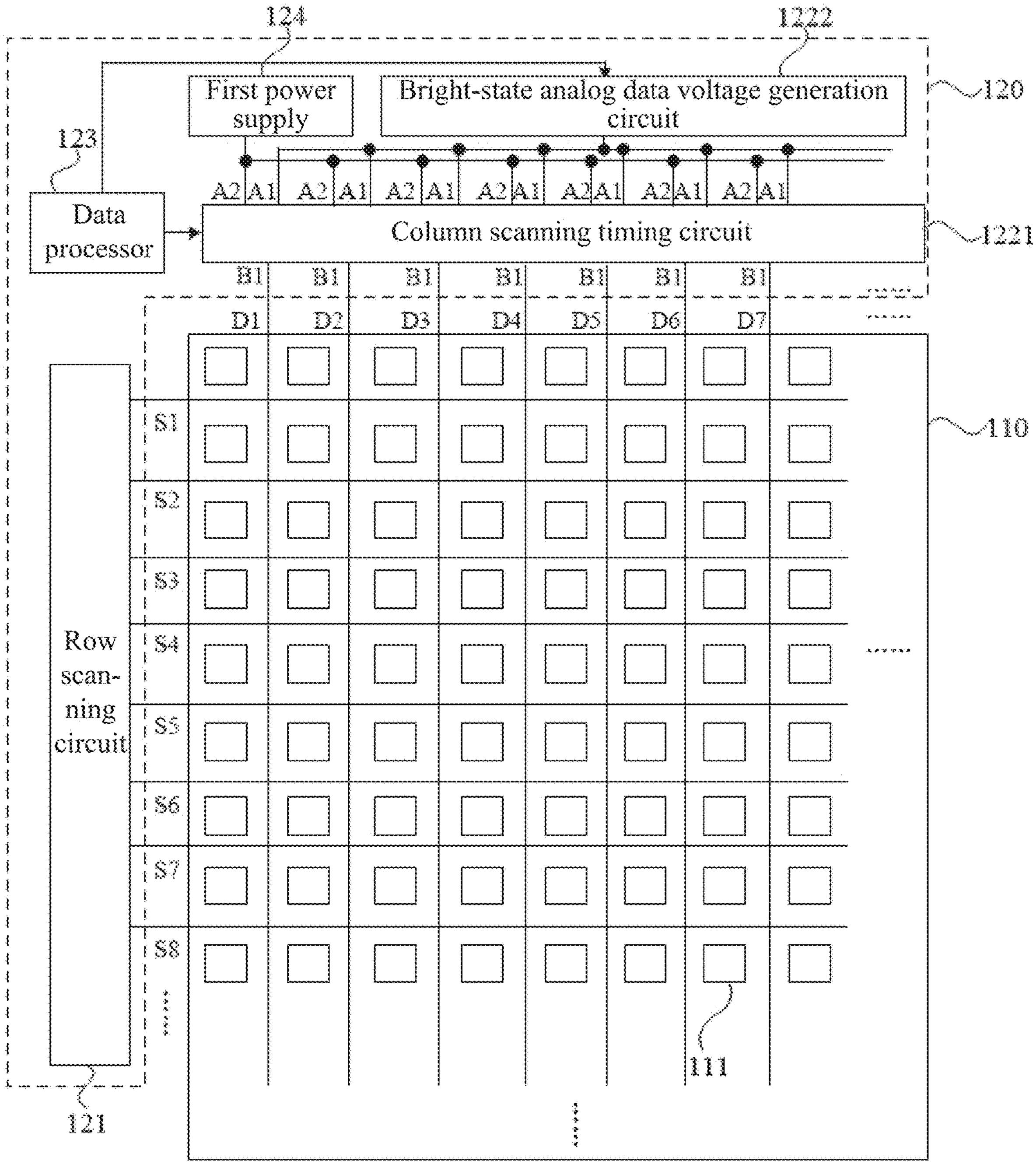
FIG. 3 is another schematic diagram of a driving apparatus for a display panel according to embodiments of the present application.

FIG. 3 is a schematic diagram of another driving apparatus for a display panel according to embodiments of the present application. The driving apparatus 120 for a display panel is included in a display apparatus. The display apparatus further includes a display panel 110. Referring to FIG. 3, on the basis of the preceding technical solutions, in an embodiment, the column scanning circuit 122 includes a column scanning timing circuit 1221 and a bright-state analog data voltage generation circuit 1222. The column scanning timing circuit 1221 includes a plurality of first input terminals A1, a plurality of second input terminals A2, and a plurality of output terminals B1. The first input terminals A1 of the column scanning timing circuit 1221 are electrically connected to the bright-state analog data voltage generation circuit 1222. The second input terminals A2 of the column scanning timing circuit 1221 receive dark-state digital data voltages.

The data processor 123 is configured to output the split display data stream to the column scanning circuit 122 in the following manner output the analog-bit display data to the bright-state analog data voltage generation circuit 1222 to enable the bright-state analog data voltage generation circuit 1222 to generate the corresponding data signals of bright-state analog data voltages according to the analog-bit display data, and output the digital-bit display data to the column scanning timing circuit 1221 to enable the column scanning timing circuit 1221 to control, according to the digital-bit display data, the plurality of output terminals B1 to output the corresponding data signals of dark-state digital data voltages or the corresponding data signals of bright-state analog data voltages.

Optionally, the column scanning timing circuit 1221 may be a digital-analog conversion circuit. A plurality of pieces of display data (including analog-bit display data and digital-bit display data) in a display data stream received by the data processor 123 are stored and transmitted in digital signals (for example, binary digital signals). Accordingly, after transmitted to the bright-state analog data voltage generation circuit 1222, the analog-bit display data may be converted into corresponding bright-state analog data voltages through digital-to-analog conversion. Referring to FIG. 3, one first input terminal A1 and one second input terminal A2 correspond to one output terminal B1. The first input terminals A1 each is electrically connected to the bright-state analog data voltage generation circuit 1222. The second input terminals A2 receive the dark-state digital data voltages. Optionally, the driving apparatus 120 for the display panel 110 further includes a first power supply 124. The first power supply 124 may be configured to provide dark-state digital data voltages. The second input terminals A2 may be electrically connected to the first power supply 124. After the digital-bit display data is outputted to the column scanning timing circuit 1221, for example, the data processor 123 provides the column scanning circuit 122 with digital-bit data voltages corresponding to a row of sub-pixels 111 within one sub-frame each time. In such a way, the column scanning timing circuit 1221 determines the first input terminals A1 connected to the output terminals B1 or the second input terminals A2 connected to the output terminals B1 according to the digital-bit data voltage corresponding to each sub-pixel 111, and thus, the column scanning timing circuit 1221 is controlled to output bright-state analog data voltages or dark-state digital data voltages.

The arrangement in which the data processor 123 outputs the analog-bit display data to the bright-state analog data voltage generation circuit 1222 and outputs the digital-bit display data to the column scanning timing circuit 1221 enables analog driving and digital driving to be implemented in hardware independently, thus relatively simplifying the row scanning algorithm timing and the column scanning algorithm timing.

Figure 4:
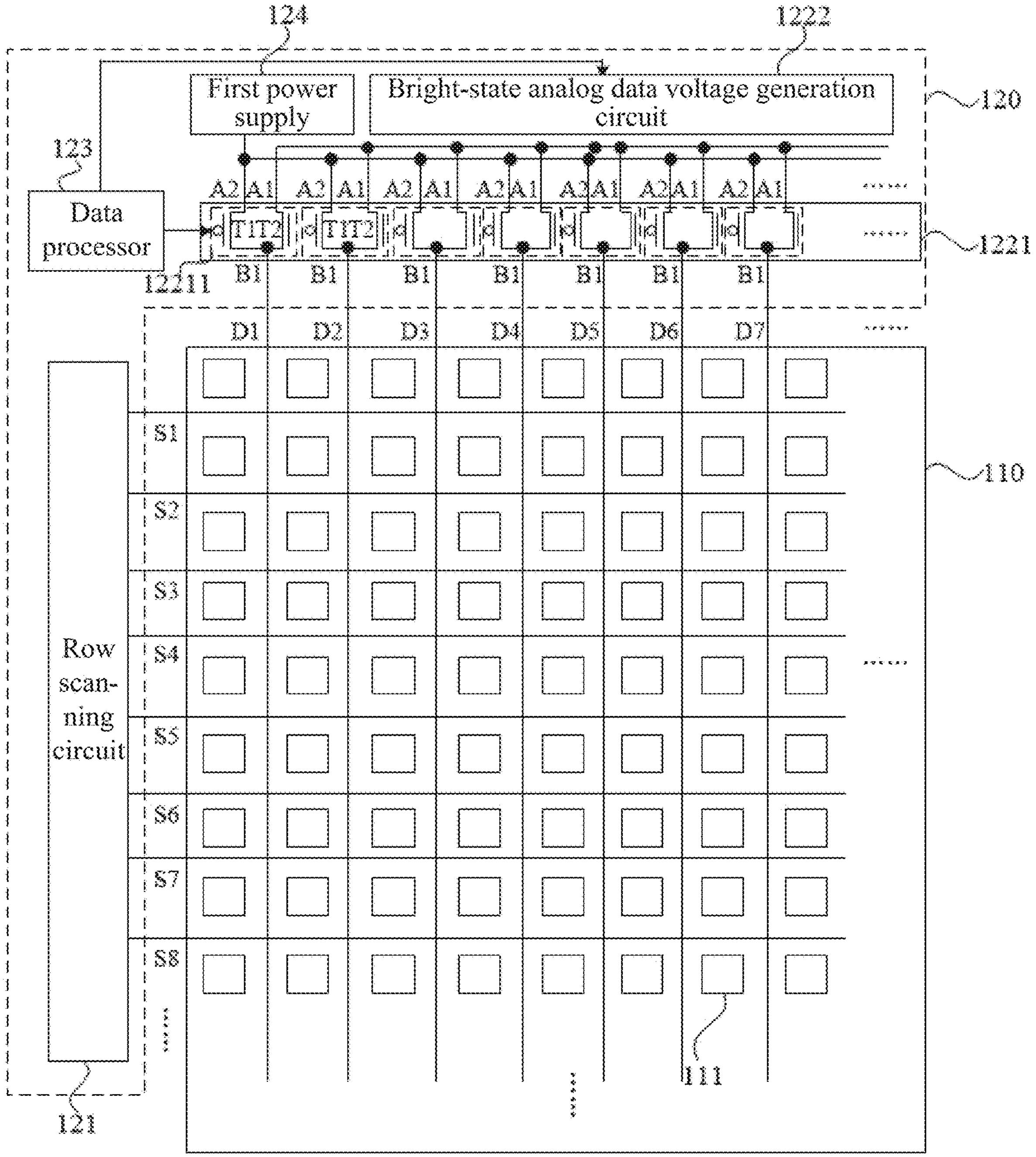
FIG. 4 is another schematic diagram of a driving apparatus for a display panel according to embodiments of the present application.

FIG. 4 is a schematic diagram of another driving apparatus for a display panel according to embodiments of the present application. The driving apparatus 120 for a display panel is included in a display apparatus. The display apparatus further includes a display panel 110. Referring to FIG. 4, on the basis of the preceding technical solutions, optionally, the column scanning timing circuit 1221 includes a plurality of gating modules 12211. Each gating module 12211 includes a first transistor T1 and a second transistor T2. The channel type of the first transistor T1 is different from the channel type of the second transistor T2. A gate of the first transistor T1 and a gate of the second transistor T2 are configured to receive digital-bit display data and to turn on or off according to the digital-bit display data. First poles of the first transistor T1 are electrically connected to the first input terminals A1 of the column scanning timing circuit 1221 in a one-to-one manner. Second poles of the first transistor T1 are electrically connected to the output terminals B1 of the column scanning timing circuit 1221 in a one-to-one manner. First poles of the second transistor T2 are electrically connected to the second input terminals A2 of the column scanning timing circuit 1221 in a one-to-one manner. Second poles of the second transistor T2 are electrically connected to the output terminals B1 of the column scanning timing circuit 1221 in a one-to-one manner.

Referring to FIG. 4, as an example for description, the first transistor T1 is a P-type transistor, and the second transistor T2 is an N-type transistor. For an example, in a scan, in the display data output from the data processor 123 to the column scanning circuit 122, in a case where the digital-bit display data corresponding to a sub-pixel is 0, the first transistor T1 of the gating module 12211 is turned on. The dark-state digital data voltages provided by the first power supply 124 are output to the corresponding sub-pixel 111 through the first transistor T1 that is turned on. In a case where the digital-bit display data corresponding to a sub-pixel is 1, the second transistor T2 of the gating module 12211 is turned on, the bright-state analog data voltages generated by the bright-state analog data voltage generation circuit according to the analog-bit display data is output to the corresponding sub-pixel 111 through the second transistor T2 that is turned on. The arrangement in which the column scanning timing circuit 1221 includes a plurality of gating modules 12211 and in which each gating module 12211 includes a first transistor T1 and a second transistor T2 with a different channel type from the first transistor T1 enables the column scanning timing circuit 1221 to output dark-state digital data voltages or bright-state analog data voltages according to the digital-bit display data. Accordingly, the column scanning timing circuit 1221 matches the scanning of the row scanning circuit 121 to implement the digital-analog hybrid driving for the display panel 110, guaranteeing an accurate display of grayscales and a good display effect.

With continued reference to FIG. 1, on the basis of the preceding technical solutions, optionally, the driving apparatus 120 for the display panel 110 includes a timing controller 125. The timing controller 125 is electrically connected to the row scanning circuit 121 and the column scanning circuit 122 and is configured to control the row scanning circuit 121 and the column scanning circuit 122 to perform scanning actions simultaneously.

For example, the timing controller 125 disposed in the driving apparatus 120 for the display panel 110 may provide timing control signals to the row scanning circuit 121 and the column scanning circuit 122 simultaneously, thus controlling the row scanning circuit 121 and the column scanning circuit 122 to perform scanning actions simultaneously. In this case, the row scanning circuit 121 and the column scanning circuit 122 are synchronized without delay. Accordingly, in a case where the row scanning circuit 121 provides scanning signals to the sub-pixels 111, the column scanning circuit 122 may write data into the sub-pixels 111. This arrangement guarantees enough time for the data to be written into the sub-pixels 111 and thus guarantees a good display effect.

Figure 5:
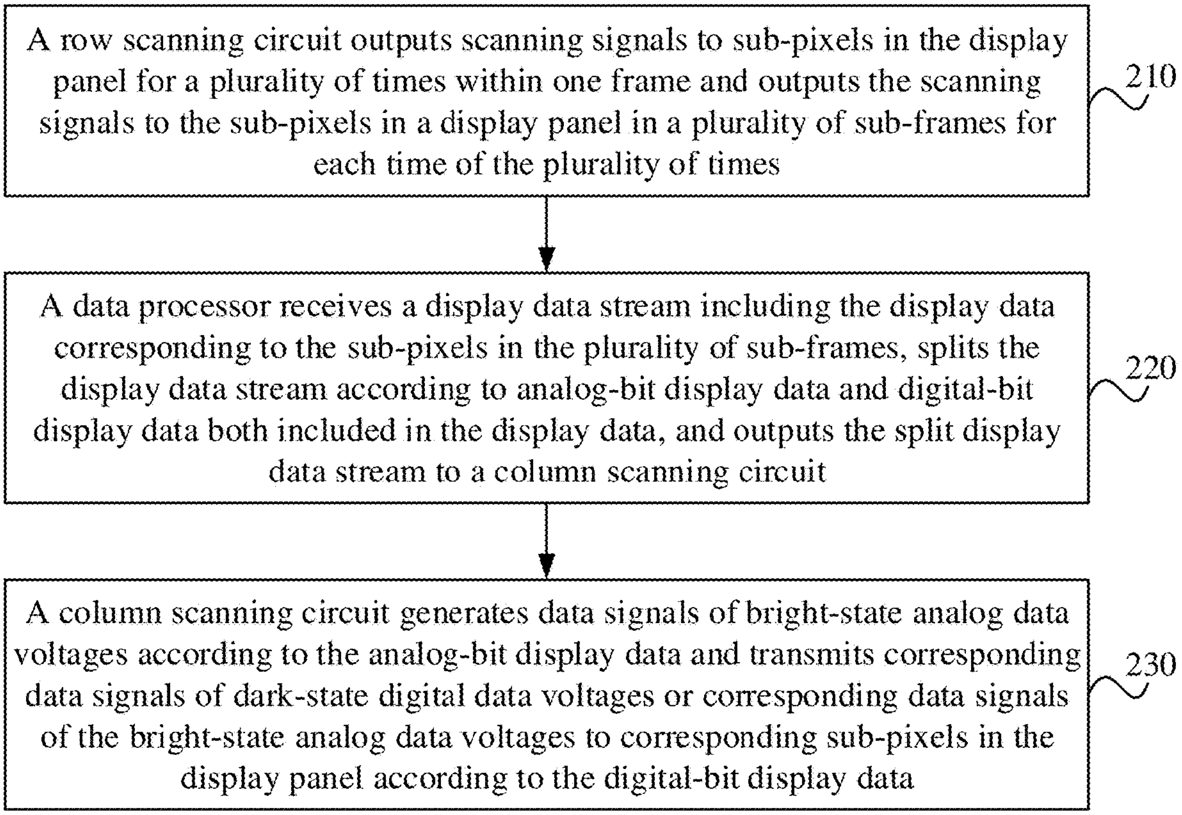
FIG. 5 is a flowchart of a driving method for a display panel according to embodiments of the present application.

Embodiments of the present application further provide a driving method for a display panel. The driving method for a display panel may be applied to drive the driving apparatus for a display panel provided in any preceding embodiments of this application. FIG. 5 is a flowchart of a driving method for a display panel according to embodiments of the present application. Referring to FIG. 1 the driving apparatus 120 for a display panel is included in a display apparatus. The display apparatus further includes a display panel 110. The driving apparatus 120 includes a row scanning circuit 121, a column scanning circuit 122, and a data processor 123.

The column scanning circuit 122 is electrically connected to the data processor 123. The display panel 110 may include a plurality of data lines (D1, D2, D3, D4, D5, D6, D7, etc.), a plurality of scanning lines (S1, S2, S3, S4, S5, S6, S7, S8, etc.), and a plurality of sub-pixels 111 defined by intersecting the data lines and the scanning lines. Referring to FIGS. 1 and 5, the driving method for a display panel includes the steps below.

In step 210, the row scanning circuit 121 outputs scanning signals to sub-pixels 111 in the display panel 110 for a plurality of times within one frame and outputs the scanning signals to the sub-pixels 111 in the display panel 110 in a plurality of sub-frames each time of the plurality of times.

In step 220, the data processor 123 receives a display data stream including the display data corresponding to the sub-pixels 111 in the plurality of sub-frames, splits the display data stream according to analog-bit display data included in the display data and digital-bit display data included in the display data, and outputs the split display data stream to the column scanning circuit 122.

In step 230, the column scanning circuit 122 generates corresponding data signals of bright-state analog data voltages according to the analog-bit display data and transmits corresponding data signals of dark-state digital data voltages or corresponding data signals of the bright-state analog data voltages to corresponding sub-pixels 111 in the display panel 110 according to the digital-bit display data.

In the driving method for a display panel provided in the present embodiments, the row scanning circuit outputs scanning signals to sub-pixels in the display panel for a plurality of times within one frame and outputs the scanning signals to the sub-pixels in the display panel in a plurality of sub-frames each time of the plurality of times. The data processor splits a display data stream according to the analog-bit display data included in the display data and the digital-bit display data included in the display data and outputs the split display data stream to the column scanning circuit. The column scanning circuit generates corresponding data signals of bright-state analog data voltages according to the analog-bit display data and transmits generated corresponding data signals of dark-state digital data voltages or the generated corresponding data signals of the bright-state analog data voltages to corresponding sub-pixels in the display panel according to the digital-bit display data. Compared with the related driving method of pure digital driving, relatively fewer sub-frames are divided in the driving method for a display panel provided in the present embodiments. Accordingly, difference between a luminous duration of a sub-frame with a shorter luminous duration and a luminous duration of a sub-frame with a longer luminous duration is relatively small, restraining the "false contour" of the display to a certain degree and enhancing the display effect. Moreover, in the driving method for a display panel provided in the present embodiments, a total number of bright-state analog data voltages is relatively fewer. Accordingly, the bright-state analog data voltages can be fully expanded to enable an accurate correspondence between various display grayscales and bright-state analog data voltages, avoiding the problem that high-grayscale images cannot be expanded through pure analog driving in the related art and thus enhancing the display effect.

On the basis of the preceding technical solutions, in an embodiment, the number of bits of the analog-bit display data is greater than one. The bright-state analog data voltages corresponding to the analog-bit display data include a first segment and a second segment. A maximum bright-state analog data voltage in the first segment is lower than a minimum bright-state analog data voltage in the second segment. The bright-state analog data voltages in the first segment are distributed non-linearly. The bright-state analog data voltages in the second segment are distributed linearly.

Figure 6:
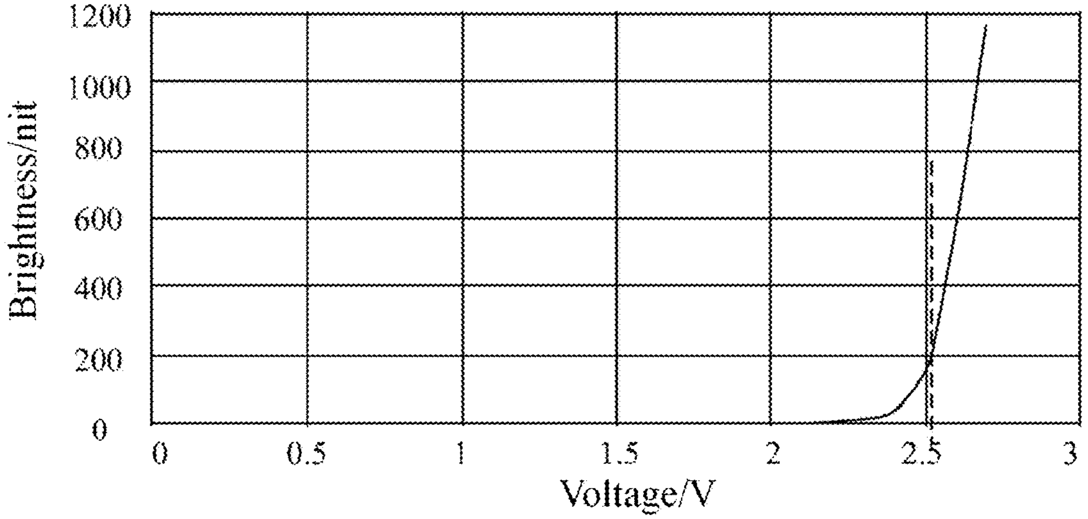
FIG. 6 is a relationship graph of analog data voltage against sub-pixel brightness in a display panel according to embodiments of the present application.

FIG. 6 is a relationship graph of analog data voltage against sub-pixel brightness in a display panel according to embodiments of the present application. Referring to FIG. 6, in FIG. 6, the brightness corresponds to grayscales. For example, in a case where the display grayscales of sub-pixels 111 include the grayscales from 0 to 255, the corresponding brightness is from 0 to 1200 nit. In a stage of relatively low brightness or relatively low grayscales (referring to the left side of the dashed line in FIG. 6), the relationship between the brightness of sub-pixels 111 and the analog data voltages is non-linear. In a stage of relatively high brightness or relatively high grayscales (referring to the right side of the dashed line in FIG. 6), the relationship between a brightness of sub-pixels 111 and the analog data voltages is linear. In the driving method for the display panel 110 in this embodiment, the number of bits of the analog-bit display data is set to be greater than one. In such a way, whenever the display data is stored and transmitted in binary digital signals, octal digital signals, or hexadecimal digital signals, a total number of bright-state analog data voltages corresponding to the analog-bit display data is larger than two. More specifically, a total number of bright-state analog data voltages corresponding to the analog-bit display data is greater than or equal to four (in a case where the total number is equal to four, the number of bits of the corresponding analog-bit display data is two and a binary digital signal is applied for storing and transmitting the display data). In such a way, the bright-state analog data voltages may be divided into a first segment and a second segment. The bright-state analog data voltages in the first segment may correspond to a stage of relatively low grayscales (referring to the left side of the dashed line in FIG. 6). The bright-state analog data voltages in the second segment may correspond to a stage of relatively high grayscales (referring to the right side of the dashed line in FIG. 6). The bright-state analog data voltages in the first segment are distributed non-linearly. The bright-state analog data voltages in the second segment are distributed linearly. With this arrangement, the distribution rule of bright-state analog data voltages matches a curve of the relationship of the analog data voltages against the brightness illustrated in FIG. 6. Accordingly, the bright-state analog data voltages may correspond to grayscales accurately both in the stage of relatively low grayscales and in the stage of relatively high grayscales, thus guaranteeing a good display effect.

With continued reference to FIG. 1, on the basis of the preceding technical solutions, optionally, the row scanning circuit 121 outputs scanning signals to the sub-pixels 111 in the display panel 110 for a plurality of times within one frame. The scanning signals are output to the sub-pixels 111 in the display panel 110 in a plurality of sub-frames each time of the plurality of times. This arrangement includes that the row scanning circuit 121 outputs scanning signals to the sub-pixels 111 for n times within one frame and outputs the scanning signals to the sub-pixels 111 ink sub-frames each time. n denotes a number of the bright-state analog data voltages made available by the column scanning circuit 122. The number of the bright-state analog data voltages made available by the column scanning circuit 122 is positively correlated with the number of bits of analog-bit display data. k denotes a number of bits of digital-bit display data.

For example, as for the display data 01010101, still as an example for description, the first three bits are analog-bit display data and the last five bits are digital-bit display data. For example, the display data is in binary digital signals. In a case where the first three bits are analog-bit display data, the total number of bright-state analog data voltage made available by the column scanning circuit 122 is eight. Correspondingly, the row scanning circuit 121 outputs scanning signals to the sub-pixels 111 for eight times within one frame and outputs the scanning signals in k sub-frames each time. Moreover, whatever numeral systems of digital signals are applied for the display data, it satisfies that more number of bits of analog-bit display data indicates more number of corresponding bright-state analog data voltages. That is, the number of bright-state analog data voltages made available by the column scanning circuit 122 is positively correlated with the number of bits of analog-bit display data. The five bits of digital-bit display data indicate that scanning signals are output to the sub-pixels 111 in five sub-frames. That is, as for the display data 01010101, in a case where the first three bits are analog-bit display data and the last five bits are digital-bit display data, scanning signals are output to the sub-pixels 111 for eight times and are output in five sub-frames each time. In the digital-bit display data of five bits, each digital bit may determine the bright state or the dark state of corresponding sub-pixels 111 within one sub-frame. For example, in a case where the digital-bit display data is 10101, the bright state or the dark state of the sub-frames corresponding to the digital bits in an order from the lower bit to the higher bit are bright state, dark state, bright state, dark state, and bright state respectively.

Optionally, in the display data, the number of bits of analog-bit display data is equal to one. Accordingly, on the basis of implementing the digital-analog hybrid driving, the number of bright-state analog data voltages is as small as possible so that the number of scanning times within one frame is reduced. For example, the display data is represented in binary digital signals. In a case where the number of bits of analog-bit display data is one, the number of corresponding bright-state analog data voltages is only two. Corresponding, scanning signals are output to the sub-pixel 111*s* twice within one frame and each time in K sub-frames. Accordingly, the scanning frequency of the row scanning circuit 121 is reduced and thus the driving power consumption of the row scanning circuit 121 is reduced.

With continued reference to FIG. 1, on the basis of the preceding technical solutions, in an embodiment, the column scanning circuit 122 transmits corresponding data signals of bright-state analog data voltages to corresponding sub-pixels 111 in the display panel 110 according to the analog-bit display data and transmit generated corresponding data signals of dark-state digital data voltages to corresponding sub-pixels 111 in the display panel 110 according to digital-bit display data. This arrangement includes in a case where scanning signals are output to the sub-pixels 111 in the display panel 110 in a plurality of sub-frames for the $i^{th}$ time within one frame, the column scanning circuit 122 generates a corresponding $i^{th}$ bright-state analog data voltage according to the analog-bit display data and outputs a data signal of the $i^{th}$ bright-state analog data voltage to the sub-pixels 111 corresponding to grayscales from N*i/n to N−1 according to the digital-bit display data. N denotes a total number of the grayscales. A higher i indicates a higher $i^{th}$ bright-state analog data voltage. In a case where scanning signals are output to the sub-pixels 111 in the display panel 110 in a plurality of sub-frames for the $m^{th}$ time, the column scanning circuit 122 generates a corresponding $m^{th}$ bright-state analog data voltage according to the analog-bit display data and outputs a corresponding data signal of a dark-state digital data voltage or a data signal of the $m^{th}$ bright-state analog data voltage to the sub-pixels 111 corresponding to grayscales from $$\frac{(m-1)*N}{n} \text{ to } \frac{N*m}{n}-1$$

according to the digital-bit display data. 1≤i≤m−1 and 2≤m≤n.

In an embodiment, the column scanning circuit 122 generates corresponding data signals of bright-state analog data voltages according to the analog-bit display data and transmits the data signals of corresponding dark-state digital data voltages or the corresponding data signals of bright-state analog data voltages to corresponding sub-pixels 111 in the display panel 110. This arrangement includes in a case where scanning signals are output to the sub-pixels 111 in the display panel 110 in a plurality of sub-frames for the $i^{th}$ time within one frame, the column scanning circuit 122 generates a corresponding $i^{th}$ bright-state analog data voltage according to the analog-bit display data, outputs a data signal of the $i^{th}$ bright-state analog data voltage to sub-pixels 111 corresponding to grayscales N*i/n to N−1 according to the digital-bit display data, and outputs a corresponding data signal of a dark-state digital data voltage or a data signal of the $m^{th}$ bright-state analog data voltage to sub-pixels 111 corresponding to grayscales from $$\frac{(i-1)*N}{n} \text{ to } \frac{N*i}{n}-1$$

according to the digital-bit display data. N denotes a total number of the grayscales. A higher i indicates a higher $i^{th}$ bright-state analog data voltage, where i=1, n−1. In a case where the scanning signals are output to the sub-pixels 111 in the display panel 110 in a plurality of sub-frames in the $n^{th}$ time, the column scanning circuit 122 generates a corresponding $n^{th}$ bright-state analog data voltage according to the analog-bit display data and outputs a corresponding data signal of a dark-state digital data voltage or a data signal of the $n^{th}$ bright-state analog data voltage to sub-pixels 111 corresponding to grayscales from $$\frac{(n-1)*N}{n} \text{ to } N-1$$

according to the digital-bit display data.

Still as an example for description, the display data is in eight bits, where the first three bits are analog-bit display data (n=8) and the last five bits are digital-bit display data (k=5). The three bits of analog bits indicate scanning for eight times. The five bits of digital bits indicate five sub-frames each time. That is, scanning signals are output to the sub-pixels 111 in the display panel 110 for eight times totally within one frame and are output the sub-pixels 111 in the display panel 110 in five sub-frames each time. Table 1 describes a correspondence between the analog-bit display data of the first three bits and the bright-state analog data voltages.

TABLE 1

Correspondence between analog bits and bright-state analog data voltages

| Analog bit | Bright-sate analog data voltage (V) |
|---|---|
| 0 (000) | 2.5 |
| 1 (001) | 2.55 |
| 2 (010) | 2.57 |
| 3 (011) | 2.6 |
| 4 (100) | 2.62 |
| 5 (101) | 2.65 |
| 6 (110) | 2.67 |
| 7 (111) | 2.7 |

The analog bit 000 corresponds to a first bright-state analog data voltage. The analog bit 001 corresponds to a second bright-state analog data voltage. The analog bit 010 corresponds to a third bright-state analog data voltage. The analog bit 011 corresponds to a fourth bright-state analog data voltage. The analog bit 100 corresponds to a fifth bright-state analog data voltage. The analog bit 101 corresponds to a sixth bright-state analog data voltage. The analog bit 110 corresponds to a seventh bright-state analog data voltage. The analog bit 111 corresponds to an eighth bright-state analog data voltage. As an example for description, the grayscales of the sub-pixels in the display panel 100 are grayscales 0 to 255, and each analog-bit display data may correspond to 32 grayscales since 256/8=32. Accordingly, the analog-bit display data 000 may correspond to grayscales 0 to 31. That is, in a case where the display grayscales of sub-pixels range from 0 to 31, the corresponding bright-state analog data voltages are 2.5 V, and the analog-bit display data 001 may correspond to grayscales 32 to 63. In such a way, the analog-bit display data 010 may correspond to grayscales 64 to 95. The analog-bit display data 011 may correspond to grayscales 96 to 127. The analog-bit display data 100 may correspond to grayscales 128 to 159. The analog-bit display data 101 may correspond to grayscales 160 to 191. The analog-bit display data 110 may correspond to grayscales 192 to 223. The analog-bit display data 111 may correspond to grayscales 224 to 256.

The description hereinafter is made with an example in which each digital bit in the display data is in binary digital signals. For example, as for the display data 00001010, the analog-bit display data is 000, corresponding to the first bright-state analog data voltage. The digital-bit display data is 01010, corresponding to the $10^{th}$ display grayscale since $2^4*0+2^3*1+2^2*0+2^1*1+2^0*0=10$. Accordingly, in a case where scanning signals are output to the sub-pixels in five sub-frames for the first time within one frame, the column scanning circuit 122 generates a first bright-state analogy data voltage of 2.5 V according to the analog-bit display data 000. Moreover, in a case where the sub-pixels are scanned for the first time, the column scanning circuit 122 outputs dark-state digital data voltages or bright-state analog data voltages corresponding to grayscales from (1−1)*256/8 to $256*\frac{1}{8}-1$, that is, from grayscales from 0 to 31. In such a way, according to the first sub-frame, the second sub-frame, the third sub-frame, the fourth sub-frame, and the fifth sub-frame corresponding to bits from the lowest bit to the highest bit of the digital-bit display data 01010, a dark-state digital data voltage, a first bright-state data voltage, a dark-state digital data voltage, a first-bright state data voltage, and a dark-state digital data voltage are output to the sub-pixel corresponding to the $10^{th}$ grayscale respectively. That is, the display data 00001010 corresponds to the case where i=1.

In another example, as for the display data 01100001, the analog-bit display data is 011, corresponding to the fourth bright-state analog data voltage and thus grayscales from 96 to 127. The digital-bit display data is 00001, corresponding to the $97^{th}$ grayscale since $2^4*0+2^3*0+2^2*0+2^1*0+2^0*1+96=97$. Accordingly, in a case where scanning signals are output to the sub-pixels in five sub-frames for the fourth time within one frame, the column scanning circuit 122 generates a fourth bright-state analogy data voltage of 2.6 V according to the analog-bit display data 011. Moreover, in a case where the sub-pixels are scanned for the fourth time, the column scanning circuit 122 outputs dark-state digital data voltages or bright-state analog data voltages corresponding to grayscales from (4−1)*256/8 to $256*\frac{4}{8}-1$, that is, grayscales from 96 to 128. In such a way, according to the first sub-frame, the second sub-frame, the third sub-frame, the fourth sub-frame, and the fifth sub-frame corresponding to bits from the lowest bit to the highest bit of the digital-bit display data 00001, a fourth bright-state analog data voltage, a dark-state digital data voltage, a dark-state digital data voltage, a dark-state digital data voltage, and a dark-state digital data voltage are output to the sub-pixel corresponding to the $97^{th}$ grayscale respectively. That is, the display data 01100001 corresponds to the case where i=4.

In an embodiment, in the case where i=4, in a case where sub-pixels are scanned from the first time to the third time (i=1, 2, 3), the column scanning circuit 122 generates a first bright-state analog data voltage of 2.5 V, a second bright-state analog data voltage of 2.55 V, and a third bright-state analog data voltage of 2.57 V respectively. Moreover, in the scanning for the first time, the column scanning circuit 122 outputs a first bright-state data voltage of 2.5 V to the sub-pixels corresponding to grayscales from $256*\frac{1}{8}$ to 256−1, that is, grayscales from 32 to 255, according to the digital-bit display data. That is, in the scanning for the first time, the sub-pixels corresponding to grayscales from 32 to 255 correspond to the display data 00011111. In the scanning for the second time, the column scanning circuit 122 outputs a second bright-state data voltage of 2.55 V to the sub-pixels corresponding to grayscales from $256*\frac{2}{8}$ to 256−1, that is, grayscales from 64 to 255, according to the digital-bit display data. That is, in the scanning for the second time, the sub-pixels corresponding to grayscales from 64 to 255 correspond to the display data 00111111. In the scanning for the third time, the column scanning circuit 122 outputs a second bright-state data voltage of 2.57 V to the sub-pixels corresponding to grayscales from 256*3/8 to 256−1, that is, grayscales from 96 to 255, according to the digital-bit display data. That is, in the scanning for the third time, the sub-pixels corresponding to grayscales from 96 to 255 correspond to the display data 01011111.

According to the preceding analysis, in a case where the row scanning circuit 121 outputs scanning signals for the $m^{th}$ time within one frame, the bright-state analog data voltage has been written into the sub-pixel corresponding to grayscales from $$\frac{(m-1)*N}{n} \text{ to } \frac{N*m}{n}-1.$$

Moreover, in a case where the scanning signals are output to the sub-pixels for the $i^{th}$ (i=1, . . . , m−1) time, the sub-pixel corresponding to grayscales from $$\frac{(m-1)*N}{n} \text{ to } \frac{N*m}{n}-1$$

is in the lighting state; in this case, the column scanning circuit 122 outputs an $i^{th}$ bright-state analog data voltage to the sub-pixel corresponding to grayscales from $$\frac{(m-1)*N}{n} \text{ to } \frac{N*m}{n}-1.$$

Accordingly, as for the sub-pixel corresponding to grayscales from $$\frac{(m-1)*N}{n} \text{ to } \frac{N*m}{n}-1,$$

in a case where the row scanning circuit 121 outputs scanning signals to sub-pixels for the first (m−1) times within one frame, the sub-pixel corresponding to grayscales from $$\frac{(m-1)*N}{n} \text{ to } \frac{N*m}{n}-1$$

is in the lighting state. In such a way, in a case where the scanning signals are output to the sub-pixels in the $m^{th}$ time, the time in a case where the sub-pixel is lit in the scanning for the first (m−1) times is taken as the basic lighting time. On the basis of the basic lighting time, according to the digital-bit display data of the sub-pixel corresponding to grayscales from $$\frac{(m-1)*N}{n} \text{ to } \frac{N*m}{n}-1,$$

the lighting time is continued to generate within the sub-frames to be lit. This arrangement makes full use of the time of scanning each time. Moreover, as scanning times increase, the bright-analog data voltage increases gradually. Accordingly, the sub-pixel corresponding to grayscales from $$\frac{(m-1)*N}{n} \text{ to } \frac{N*m}{n}-1$$

is always lit in the scanning for the first (m−1) times so that the lighting time of the sub-pixel corresponding to grayscales from $$\frac{(m-1)*N}{n} \text{ to } \frac{N*m}{n}-1$$

is relatively short in the scanning for the $m^{th}$ time, thus reducing power consumption.

It is to be noted that as for the sub-pixel corresponding to any one of grayscales (corresponding to the $j^{th}$ bright-state analog data voltage where 1≤j≤n−1), in a case where scanning signals are output to the sub-pixels for the $j^{th}$ time, the writing of the bright-state analog data voltage has been completed. Accordingly, in a case where scanning signals are output to the sub-pixels for the $(j+1)^{th}$ time to the $n^{th}$ time, the column scanning circuit 122 may output dark-state digital data voltages to the sub-pixels corresponding to the grayscales, guaranteeing an accurate display of grayscales.

With continued reference to FIG. 1, on the basis of the preceding technical solutions, optionally, in a case where the row scanning circuit 121 outputs scanning signals to sub-pixels 111 in the display panel 110 in a plurality of sub-frames for two adjacent times of the plurality of times within one frame, a duration of the sub-frame with a shortest scanning duration in the latter scanning is shorter than a duration of the sub-frame with a shortest scanning duration in the previous scanning.

Specifically, the row scanning circuit 121 outputs scanning signals to sub-pixels 111 in the display panel 110 for a plurality of times within one frame and outputs the scanning signals to the sub-pixels 111 in the display panel 110 in a plurality of sub-frames each time of the plurality of times. In a case where the scanning signals are output to the sub-pixels 111 in the display panel 110 in a plurality of sub-frames for two adjacent times within one frame, a bright-state analog data voltage generated by the column scanning circuit 122 in the latter scanning is higher than a bright-state analog data voltage generated by the column scanning circuit 122 in the previous scanning. Accordingly, to achieve a same increase among grayscales, the luminous duration to be increased is relatively reduced. The luminous duration may be controlled by controlling the duration of the sub-pixels. In such a way, in a case where the scanning signals are output to the sub-pixels 111 in the display panel 110 in a plurality of sub-frames for two adjacent times within one frame, a duration of the sub-frame with a shortest scanning duration in a latter scanning is shorter than a duration of the sub-frame with a shortest scanning duration in a previous scanning. Correspondingly, a duration of each sub-frame in the latter scanning is shorter than a duration of a corresponding sub-frame in the previous scanning, thus implementing an accurate control of grayscales.

Referring to FIG. 3, the present application provides a display apparatus. The display apparatus includes the driving apparatus 120 for a display panel provided in any preceding embodiments and the display panel 110 connected to the driving apparatus 120 for a display panel.

The display panel 100 includes sub-pixels 111.

Referring to FIG. 2, in an embodiment, the sub-pixels 111 include a pixel circuit. The pixel circuit includes a data writing transistor T0, a driving transistor DT, a scanning signal input terminal Scan, a data signal input terminal Vdata, and a light-emitting device LED. The scanning signal input terminal Scan is electrically connected to the row scanning circuit 121 of the driving apparatus 120 and is configured to receive scanning signals output by the row scanning circuit 121. The data signal input terminal Vdata is electrically connected to the column scanning circuit 122 of the driving apparatus 120 and is configured to receive data signals output by the column scanning circuit 122. The data writing transistor T0 is electrically connected to the driving transistor DT, the scanning signal input terminal Scan, and the data signal input terminal Vdata. The data writing transistor is T0 configured to write the data signal received by the data signal input terminal Vdata into a gate of the driving transistor DT. The driving transistor DT is electrically connected to the light-emitting device LED and is configured to drive the light-emitting device LED to emit light according to a gate voltage of the driving transistor DT.

The pixel circuit further includes a storage capacitor Cst, a first voltage input terminal VDD, and a second voltage input terminal VSS. A first end of the storage capacitor Cst is electrically connected to the gate of the driving transistor DT. A second end of the storage capacitor Cst is electrically connected to a first pole of the driving transistor DT. The first voltage input terminal VDD is electrically connected to the first pole of the driving transistor DT. A second pole of the driving transistor DT is electrically connected to a first pole of the light-emitting device LED. A second pole of the light-emitting device LED is electrically connected to the second voltage input terminal VSS.

The display apparatus further includes scanning lines. The row scanning circuit 121 of the driving apparatus 120 is electrically connected to the scanning signal input terminals Scan through the scanning lines.

The display apparatus further includes data lines. The column scanning circuit 122 of the driving apparatus 120 is electrically connected to the data signal input terminals Vdata through the data lines.

The display apparatus further includes an image data signal processing chip configured to generate a display data stream. For example, the display apparatus may include the image data signal processing chip that generates a display data stream. The data processor 123 may receive the display data stream from the image data signal processing chip.

The display apparatus provided in the present embodiments includes the driving apparatus for a display panel described in any embodiments of the present application and may implement the driving method for a display panel described in any embodiments of the present application.

Figure 7:
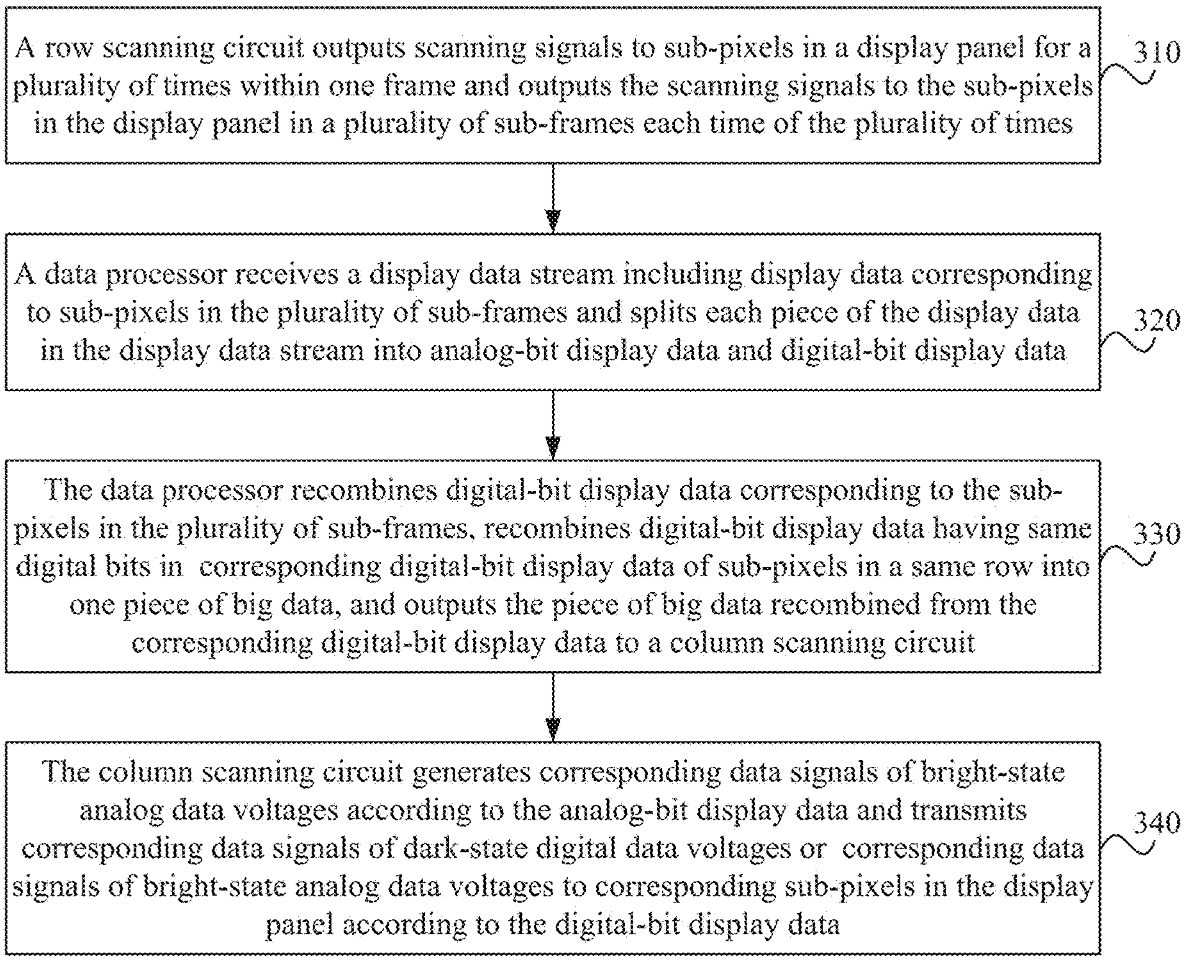
FIG. 7 is another flowchart of a driving method for a display panel according to embodiments of the present application.

FIG. 7 is another flowchart of a driving method for a display panel according to embodiments of the present application. In connection with FIG. 2, referring to FIG. 7, on the basis of the preceding technical solutions, optionally, the driving method for a display panel includes the steps below.

In step 310, the row scanning circuit 121 outputs scanning signals to sub-pixels 111 in the display panel 110 for a plurality of times within one frame and outputs the scanning signals to the sub-pixels 111 in the display panel 110 in a plurality of sub-frames each time of the plurality of times.

In step 320, the data processor 123 receives a display data stream including display data corresponding to sub-pixels 111 in the plurality of sub-frames and splits each piece of the display data in the display data stream into the analog-bit display data and digital-bit display data.

In step 330, the data processor 123 recombines digital-bit display data corresponding to the sub-pixels 111 in the plurality of sub-frames, recombines the digital-bit display data having same digital bits in corresponding digital-bit display data of sub-pixels in a same row into one piece of big data, and outputs the piece of big data recombined from the corresponding digital-bit display data to the column scanning circuit 122.

Optionally, after receiving the display data stream, the data processor 123 may divide each piece of the display data included in the display data stream firstly. Each piece of the display data is split into analog-bit display data and digital-bit display data. The analog-bit display data in corresponding display data of the sub-pixels may correspond to bright-state analog data voltages in one scanning, and the digital-bit display data in the corresponding display data of the sub-pixels may correspond to digital voltages of the sub-pixels in a plurality of sub-frames in one scanning (controlling the bright state or the dark state). Since the display data includes the digital voltages of the sub-pixels in a plurality of sub-frames in the one scanning and the one scanning is carried out frame by frame, it is necessary to recombine the digital-bit display data corresponding to a same sub-frame in the display data. Moreover, in the scanning of each frame, scanning signals are typically provided for the sub-pixels row by row. Accordingly, in an embodiment, the digital-bit display data having same digital bits in digital-bit display data corresponding to sub-pixels in the same row is recombined into one piece of data. Accordingly, in the scanning in row within each sub-frame, when a row is scanned, the data processor 123 outputs the data corresponding to the sub-pixels in the row to the column scanning circuit 122. For example, as an example in which a row includes three sub-pixels, the digital-bit display data corresponding to the three sub-pixels are 1010, 1101, and 0101 respectively. Then four sub-frames are divided in the one scanning each time. From the sub-frame corresponding to the lowest bit to the sub-frame corresponding to the highest bit, the corresponding data are 011, 100, 011, 110 respectively. Accordingly, from the sub-frame corresponding to the lowest bit to the sub-frame corresponding to the highest bit, the data corresponding to the row provided by the data processor 123 for the column scanning circuit 122 are 011, 100, 011, 110 respectively.

In step 340, the column scanning circuit 122 generates corresponding data signals of bright-state analog data voltages according to the analog-bit display data and transmits corresponding data signals of dark-state digital data voltages or the corresponding data signals of the bright-state analog data voltages to corresponding sub-pixels in the display panel 110 according to the digital-bit display data.

The arrangement in which the data processor 123 recombines the digital-bit display data corresponding to the sub-pixels in the sub-frames helps avoid data disorder caused by excessive display data, which ensures the data to be output from the data processor 123 to the column scanning circuit 122 in an orderly manner, and thus guarantees an accurate display of each grayscale and a good display effect.

What is claimed is:

1. A driving apparatus for a display panel, comprising:

a row scanning circuit configured to output scanning signals to sub-pixels in the display panel for a plurality of times within one frame and output the scanning signals to the sub-pixels in the display panel in a plurality of sub-frames each time of the plurality of times;

a data processor configured to receive a display data stream comprising display data corresponding to the sub-pixels in the plurality of sub-frames, split the display data stream according to analog-bit display data comprised in the display data and digital-bit display data comprised in the display data, and output the split display data stream to a column scanning circuit; and the column scanning circuit electrically connected to the data processor and configured to generate, according to the analog-bit display data, corresponding data signals of bright-state analog data voltages, and, transmit, according to the digital-bit display data, generated corresponding data signals of dark-state digital data voltages or the generated corresponding data signals of the bright-state analog data voltages to corresponding sub-pixels in the display panel;

wherein the data processor is configured to:

receive the display data stream comprising the display data corresponding to the sub-pixels in the plurality of sub-frames and split each piece of the display data in the display data stream into the analog-bit display data and the digital-bit display data; and recombine the digital-bit display data in the plurality of sub-frames and corresponding to the sub-pixels, recombine digital-bit display data having same digital bits in digital-bit display data corresponding to sub-pixels in a same row into one piece of data, and output the data recombined from the corresponding digital-bit display data to the column scanning circuit.

2. The driving apparatus for the display panel according to claim 1, wherein the column scanning circuit comprises a column scanning timing circuit and a bright-state analog data voltage generation circuit, the column scanning timing circuit comprises a plurality of first input terminals, a plurality of second input terminals, and a plurality of output terminals, the plurality of first input terminals of the column scanning timing circuit are electrically connected to the bright-state analog data voltage generation circuit, and the plurality of second input terminals of the column scanning timing circuit are configured to receive dark-state digital data voltages; and wherein the data processor is configured to output the split display data stream to the column scanning circuit in a following manner:

output the analog-bit display data to the bright-state analog data voltage generation circuit to enable the bright-state analog data voltage generation circuit to generate the corresponding data signals of the bright-state analog data voltages according to the analog-bit display data, and output the digital-bit display data to the column scanning timing circuit to enable the column scanning timing circuit to control, according to the digital-bit display data, the plurality of output terminals to output the corresponding data signals of the dark-state digital data voltages or the corresponding data signals of the bright-state analog data voltages.

3. The driving apparatus for the display panel according to claim 2, wherein the column scanning timing circuit comprises a plurality of gating modules, the plurality of gating modules each comprises a first transistor and a second transistor, and a channel type of the first transistor is different from a channel type of the second transistor; and a gate of the first transistor and a gate of the second transistor are configured to receive the digital-bit display data and turn on or off according to the digital-bit display data, first poles of the first transistor are electrically connected to the plurality of first input terminals of the column scanning timing circuit in a one-to-one manner, second poles of the first transistor are electrically connected to the plurality of output terminals of the column scanning timing circuit in a one-to-one manner, first poles of the second transistor are electrically connected to the plurality of second input terminals of the column scanning timing circuit in a one-to-one manner, and second poles of the second transistor are electrically connected to the plurality of output terminals of the column scanning timing circuit in a one-to-one manner.

4. The driving apparatus for the display panel according to claim 1, further comprising:

a timing controller electrically connected to the row scanning circuit and the column scanning circuit and configured to control the row scanning circuit and the column scanning circuit to perform scanning actions simultaneously.

5. The driving apparatus for the display panel according to claim 2, further comprising a first power supply, wherein the power supply is connected to the plurality of second input terminals and is configured to provide the dark-state digital data voltages.

6. The driving apparatus for the display panel according to claim 3, wherein the first transistor is a P-type transistor and the second transistor is an N-type transistor.

7. A display apparatus, comprising a driving apparatus for a display panel and a display panel connected to the driving apparatus for a display panel, wherein the driving apparatus for a display panel comprises:

a row scanning circuit configured to output scanning signals to sub-pixels in the display panel for a plurality of times within one frame and output the scanning signals to the sub-pixels in the display panel in a plurality of sub-frames each time of the plurality of times;

a data processor configured to receive a display data stream comprising display data corresponding to the sub-pixels in the plurality of sub-frames, split the display data stream according to analog-bit display data comprised in the display data and digital-bit display data comprised in the display data, and output the split display data stream to a column scanning circuit; and the column scanning circuit electrically connected to the data processor and configured to generate, according to the analog-bit display data, corresponding data signals of bright-state analog data voltages, and, transmit, according to the digital-bit display data, generated corresponding data signals of dark-state digital data voltages or the generated corresponding data signals of the bright-state analog data voltages to corresponding sub-pixels in the display panel:, wherein the data processor is configured to:

receive the display data stream comprising the display data corresponding to the sub-pixels in the plurality of sub-frames and split each piece of the display data in the display data stream into the analog-bit display data and the digital-bit display data; and recombine the digital-bit display data in the plurality of sub-frames and corresponding to the sub-pixels, recombine digital-bit display data having same digital bits in digital-bit display data corresponding to sub-pixels in a same row into one piece of data, and output the data recombined from the corresponding digital-bit display data to the column scanning circuit.

8. The display apparatus according to claim 7, wherein the display panel comprises sub-pixels, the sub-pixels comprise a pixel circuit, and the pixel circuit comprises a data writing transistor, a driving transistor, a scanning signal input terminal, a data signal input terminal, and a light-emitting device;

wherein the scanning signal input terminal is electrically connected to the row scanning circuit of the driving apparatus and is configured to receive scanning signals output by the row scanning circuit;

wherein the data signal input terminal is electrically connected to the column scanning circuit of the driving apparatus and is configured to receive data signals output by the column scanning circuit;

wherein the data writing transistor is electrically connected to the driving transistor, the scanning signal input terminal, and the data signal input terminal and is configured to write the data signals received by the data signal input terminal into a gate of the driving transistor; and wherein the driving transistor is electrically connected to the light-emitting device and is configured to drive the light-emitting device to emit light according to a gate voltage of the driving transistor.

9. The display apparatus according to claim 8, wherein the pixel circuit further comprises a storage capacitor, a first voltage input terminal, and a second voltage input terminal, wherein a first end of the storage capacitor is electrically connected to the gate of the driving transistor, a second end of the storage capacitor is electrically connected to a first pole of the driving transistor, the first voltage input terminal is electrically connected to the first pole of the driving transistor, a second pole of the driving transistor is electrically connected to a first pole of the light-emitting device, and a second pole of the light-emitting device is electrically connected to the second voltage input terminal.

10. The display apparatus according to claim 7, further comprising scanning lines, wherein the row scanning circuit of the driving apparatus is electrically connected to scanning signal input terminals through the scanning lines.

11. The display apparatus according to claim 7, further comprising data lines, wherein the column scanning circuit of the driving apparatus is electrically connected to data signal input terminals through the data lines.

12. The display apparatus according to claim 7, further comprising an image data signal processing chip configured to generate the display data stream.

13. A driving method for a display panel, comprising:

outputting, by a row scanning circuit, scanning signals to sub-pixels in a display panel for a plurality of times within one frame and outputting, by the row scanning circuit, the scanning signals to the sub-pixels in the display panel in a plurality of sub-frames each time of the plurality of times;

receiving, by a data processor, a display data stream comprising display data corresponding to the sub-pixels in the plurality of sub-frames, splitting, the display data stream according to analog-bit display data comprised in the display data and digital-bit display data comprised in the display data, and outputting, the split display data stream to a column scanning circuit; and generating, by the column scanning circuit, according to the analog-bit display data, corresponding data signals of bright-state analog data voltages, and, transmitting, according to the digital-bit display data, corresponding data signals of dark-state digital data voltages or the corresponding data signals of the bright-state analog data voltages to corresponding sub-pixels in the display panel;

wherein receiving, by the data processor, the display data stream comprising the display data corresponding to the sub-pixels in the plurality of sub-frames, splitting the display data stream according to the analog-bit display data comprised in the display data and the digital-bit display data comprised in the display data, and outputting the split display data stream to the column scanning circuit comprise:

receiving, by the data processor, the display data stream comprising the display data corresponding to the sub-pixels in the plurality of sub-frames and splitting each piece of the display data in the display data stream into the analog-bit display data and the digital-bit display data; and recombining, by the data processor, the digital-bit display data in the plurality of sub-frames and corresponding to the sub-pixels, recombining digital-bit display data having same digital bits in digital-bit display data corresponding to sub-pixels in a same row into one piece of data, and outputting the data recombined from the corresponding digital-bit display data to the column scanning circuit.

14. The driving method for the display panel according to claim 13, wherein a number of bits of the analog-bit display data is greater than one, the bright-state analog data voltages corresponding to the analog-bit display data comprise a first segment and a second segment, a maximum bright-state analog data voltage in the first segment is lower than a minimum bright-state analog data voltage in the second segment, a plurality of bright-state analog data voltages in the first segment are distributed non-linearly, and a plurality of bright-state analog data voltages in the second segment are distributed linearly.

15. The driving method for the display panel according to claim 13, wherein outputting, by the row scanning circuit, the scanning signals to the sub-pixels in the display panel for the plurality of times within the one frame and outputting, by the row scanning circuit, the scanning signals to the sub-pixels in the display panel in the plurality of sub-frames each time of the plurality of times, comprises:

outputting, by the row scanning circuit, the scanning signals to the sub-pixels for n times within the one frame and outputting, by the row scanning circuit, the scanning signals to the sub-pixels in k sub-frames each time, wherein n denotes a number of values of the bright-state analog data voltages made available by the column scanning circuit, the number of values of the bright-state analog data voltages made available by the column scanning circuit is positively correlated with a number of bits of the analog-bit display data, and k denotes a number of bits of the digital-bit display data.

16. The driving method for the display panel according to claim 15, wherein generating, by the column scanning circuit, the corresponding data signals of the bright-state analog data voltages according to the analog-bit display data and transmitting the corresponding data signals of the dark-state digital data voltages or the corresponding data signals of the bright-state analog data voltages to corresponding sub-pixels in the display panel according to the digital-bit display data comprise:

in a case where the scanning signals are output to the sub-pixels in the display panel in the plurality of sub-frames for an $i^{th}$ time within the one frame, generating, by the column scanning circuit, a corresponding $i^{th}$ bright-state analog data voltage according to the analog-bit display data and outputting a data signal of the $i^{th}$ bright-state analog data voltage to sub-pixels corresponding to grayscales from N*i/n to (N−1) according to the digital-bit display data, wherein N denotes a total number of the grayscales, and a higher i indicates a higher $i^{th}$ bright-state analog data voltage; and in a case where the scanning signals are output to the sub-pixels in the display panel in the plurality of sub-frames for an $m^{th}$ time, generating, by the column scanning circuit, a corresponding $m^{th}$ bright-state analog data voltage according to the analog-bit display data and outputting a corresponding data signal of a dark-state digital data voltage or a data signal of the $m^{th}$ bright-state analog data voltage to sub-pixels corresponding to grayscales from $$\frac{(m-1)*N}{n} \text{ to } \frac{N*m}{n}-1$$

according to the digital-bit display data, wherein 1≤i≤m−1 and 2≤m≤n.

17. The driving method for the display panel according to claim 15, wherein generating, by the column scanning circuit, the corresponding data signals of the bright-state analog data voltages according to the analog-bit display data and transmitting the corresponding data signals of the dark-state digital data voltages or the corresponding data signals of the bright-state analog data voltages to the corresponding sub-pixels in the display panel according to the digital-bit display data comprise:

in a case where the scanning signals are output to the sub-pixels in the display panel in the plurality of sub-frames for an $i^{th}$ time within the one frame, generating, by the column scanning circuit, a corresponding $i^{th}$ bright-state analog data voltage according to the analog-bit display data, outputting a data signal of the $i^{th}$ bright-state analog data voltage to sub-pixels corresponding to grayscales from N*i/n to N−1 according to the digital-bit display data, and outputting a corresponding data signal of a dark-state digital data voltage or the data signal of the $i^{th}$ bright-state analog data voltage to sub-pixels corresponding to grayscales from $$\frac{(i-1)*N}{n} \text{ to } \frac{N*i}{n}-1$$

according to the digital-bit display data, wherein N denotes a total number of the grayscales, a higher i indicates a higher $i^{th}$ bright-state analog data voltage, and i=1, n−1; and in a case where the scanning signals are output to the sub-pixels in the display panel in the plurality of sub-frames for an $n^{th}$ time, generating, by the column scanning circuit, a corresponding $n^{th}$ bright-state analog data voltage according to the analog-bit display data and outputting a corresponding data signal of a dark-state digital data voltage or a data signal of the $n^{th}$ bright-state analog data voltage to sub-pixels corresponding to grayscales from $$\frac{(n-1)*N}{n}$$

to N−1.

18. The driving method for the display panel according to claim 16, wherein in a case where the row scanning circuit outputs the scanning signals to the sub-pixels in the display panel in the plurality of sub-frames for two adjacent times of the plurality of times within the one frame, a duration of a sub-frame with a shortest scanning duration in a latter scanning is shorter than a duration of a sub-frame with a shortest scanning duration in a previous scanning.

* * * * *